Sept. 8, 1931.   H. F. MERRIAM   1,822,447
MANUFACTURE OF $H_2SO_4$ FROM WEAK $SO_2$ GAS
Filed Jan. 16, 1928
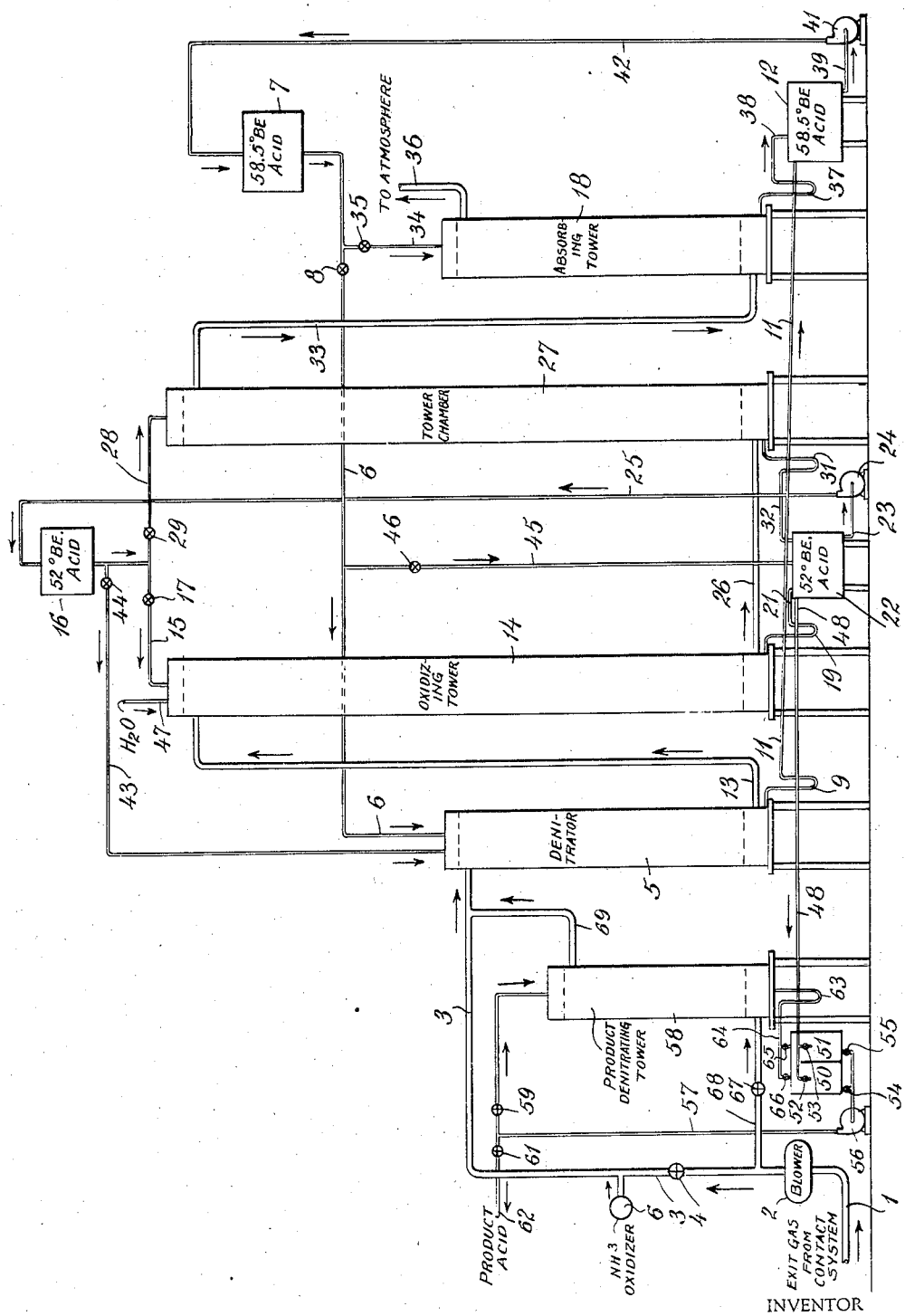
INVENTOR
Henry F. Merriam
BY Forbes Silsby
ATTORNEY Patented Sept. 8, 1931

1,822,447

UNITED STATES PATENT OFFICE

HENRY F. MERRIAM, OF WEST ORANGE, NEW JERSEY, ASSIGNOR TO GENERAL CHEMICAL COMPANY, OF NEW YORK, N. Y., A CORPORATION OF NEW YORK

MANUFACTURE OF $H_2SO_4$ FROM WEAK $SO_2$ GAS

Application filed January 16, 1928. Serial No. 247,049.

This invention relates to the oxidation of sulfur dioxide to sulfur trioxide with nitrosyl sulfuric acid, and in particular to a process adapted to treat very weak sulfur dioxide gas, such as the exit gases from contact sulfuric acid systems, for the purpose of completely removing the sulfur dioxide from such gases and of producing sulfuric acid from the sulfur dioxide thus removed.

The small percentage of sulfur dioxide in the exit gas from contact sulfuric acid plants, which seldom, if ever, exceeds 1.5% and frequently is as low as .4%, by volume, presents an extremely difficult problem in providing for its disposal. The gas is so dilute as to render treatment thereof by known methods entirely too expensive for commercial use, and yet the percentage of sulfur dioxide may be great enough, unless low concentrations are maintained, to render the gas a nuisance if discharged directly to the atmosphere in thickly inhabited industrial regions.

I have conducted an extensive investigation to develop a method of disposing of this gas and have now established that weak sulfur dioxide of the concentrations noted may be completely removed from exit gas and oxidized to sulfuric acid by means of nitrosyl sulfuric acid at a rate of oxidation much higher than in any known method, and sufficiently high to render treatment of the weak gas commercially profitable solely upon the basis of sulfuric acid produced and without credit based upon its solution of the nuisance problem, provided certain very definite conditions are observed in the operation of the process as described in detail hereinafter.

I have found that the rapidity of oxidation of very weak sulfur dioxide with nitrosyl sulfuric acid and nitrous gases, and the vapor pressure of nitrous gases above nitrosyl sulfuric acid, are subject to wide variation, depending upon what upon their face appear to be small variations in the conditions of treatment, and I attribute the failure of known methods to be commercially profitable when applied to the treatment of weak gas to a lack of knowledge of these facts.

In the accompanying drawing I have illustrated diagrammatically a system adapted for practising the process of my invention.

The exit gas from the absorbers of a contact system, which gas will ordinarily be at a temperature of less than 200° F., and, for example, containing about .8% $SO_2$ and 7% free oxygen, is introduced through line 1 into blower 2 where it is put under sufficient pressure to force it through the system. If the exit gas is under sufficient pressure due to the blower of the contact system, the supplemental blower 2 may be omitted. The gas at this point will normally contain about 7% free oxygen as noted if the contact system is operating upon brimstone as the source of sulfur, but will be somewhat less if ore is being roasted, and in that event I find it preferable to introduce sufficient air at this point to provide at least 7% oxygen, which amount is desirable to complete at a rapid rate the oxidation of the sulfur dioxide to trioxide and to oxidize the nitrous gases in the system as explained hereinafter.

The gas then passes through line 3, controlled by valve 4, into the top of tower 5. An ammonia oxidizer 6 is provided for introducing oxides of nitrogen into the gas passing through line 3 in an amount sufficient to compensate for the nitrous gases lost in the gas passing from the system due to incomplete absorption. The ammonia oxidizer may be substituted by a nitre pot as commonly used in the chamber process for producing nitric acid vapors or oxides of nitrogen, and throughout the remainder of this specification I will refer to the oxides of nitrogen present in the gas throughout the system merely as nitrous gas as their exact composition is variable and difficult to determine as is well known. The mixture of sulfur dioxide gas and nitrous gas entering tower 5 passes downwardly therethrough in contact with a descending stream of nitrosyl sulfuric acid supplied through line 6. I find it preferable to have the gas and acid pass through the tower in co-current flow as shown. The tower 5 is provided with a conventional acid distributor at the top and is filled with packing material, preferably a packing of quartz pebbles of about ¾" diameter. Line 6 connects with a head storage tank 7, the flow of acid through the line being controlled by valve 8. The acid supplied from tank 7 to the top of tower 5 should be of a strength Bé. of 58.5° plus or minus .2%, that is within the range 58.3 to 58.7° Bé., and should have an initial content of nitrosyl sulfuric acid (nitre) of not less than .6% and not over 1.5%, calculated as $N_2O_3$, a preferred strength being 1.1% for an .8% gas. The nitre content of the acid may be readily determined by known analytical methods.

The lower oxides of nitrogen introduced into line 3 by the ammonia oxidizer will have become partially transformed into higher oxides during the passage of the gas through line 3 into tower 5, and these higher oxides, together with the nitrous gas liberated from the acid supplied to tower 5, and the nitre in the acid, will rapidly oxidize the sulfur dioxide to sulfur trioxide, which will then be absorbed in the acid and tend to strengthen same slightly. I have found that this oxidation of the weak sulfur dioxide will proceed at a very rapid rate with the acid strength noted until the concentration of sulfur dioxide falls to substantially .4%. Below this point the rate of oxidation appears to drop off considerably, possibly because of the lack of sufficient water vapor in the gas, and hence I prefer to proportion the size of tower 5 with respect to the quantity of gas handled to cause the $SO_2$ content in the gas to be reduced to .4% or below at the exit of the tower, and then to cause the further and complete oxidation of the sulfur dioxide to be performed with a different strength of acid as described hereinafter. In normal operation, then, I prefer to reduce the $SO_2$ content to not greater than .4% in the tower 5, because the rate of oxidation up to this point is quite rapid, and then to continue the treatment in further and distinct stages. Hence if the exit gas from the contact system to be treated according to my process should contain less than .4% $SO_2$ I find it preferable to increase the capacity of the contact plant somewhat to thereby provide a stronger exit gas than .4% gas. By so doing I not only provide for an increased production of acid in the contact system but also permit a more efficient treatment of the exit gas in my process. It should be understood, however, that this step of providing an exit gas from the contact system containing greater than .4% $SO_2$ is not essential to the operation of my process.

Due to the use of acid of the composition given and to the fact that the oxidation of the sulfur dioxide is not carried to completion in tower 5, the acid running therefrom will have lost only a portion of its nitre content and will still contain a large amount of nitre, for example about .95% $N_2O_3$ when using an initial nitre content in the acid of 1.1% and operating upon an .8% $SO_2$ gas. By thus providing a large excess of nitre in the acid supplied to the tower I ensure a very rapid rate of oxidation of the weak $SO_2$ gas throughout the tower. The amount of acid supplied to the tower should be sufficient with respect to the quantity of gas treated as to always have present a considerable amount of nitre in the acid leaving the tower. This acid, slightly concentrated in sulfuric acid content, and partially depleted in nitre, flows through an acid seal 9 into line 11 and is conducted therethrough into pump tank 12. The partially oxidized gas leaves the tower at the bottom through line 13 and passes therethrough into the top of oxidizing tower 14, wherein the oxidation of sulfur dioxide is completed and the re-oxidation of the reduced nitrous gases is commenced.

Into the top of tower 14 is introduced a stream of nitrosyl sulfuric acid from line 15 connecting with a head supply tank 16, the flow of acid being controlled by valve 17. The gas and acid pass downwardly through the tower in intimate contact over packing material, preferably of the same type as in tower 5. The acid supplied to the tower should be of an initial strength of 52 to 54° Bé., preferably 52° Bé., and have an initial content of nitre of not less than .12% $N_2O_3$. I have found that with this strength of acid the remaining sulphur dioxide in the gas is rapidly oxidized to $SO_3$. I find that the tower 14 should be somewhat larger in proportion than tower 5, and preferably should be of sufficient capacity that the gas will be entirely free of sulfur dioxide at a point midway of the length of the tower. This permits the lower half of the tower to function solely as a nitre oxidizing chamber in which the nitrous gases reduced by oxidation of the sulphur dioxide in the tower 5 and in the upper half of tower 14 are re-oxidized to higher oxides of nitrogen, in which form they are absorbed to some extent in the acid circulating through the tower 14 and to a much larger extent in the subsequent absorbing tower 18.

By thus providing for continuing contact between the gas and acid after removal of all of the sulphur dioxide, for a period of time at least as great as that required to complete the oxidation of the sulphur dioxide with the 52 to 54° Bé. acid, I render it possible for the acid to reabsorb a considerable amount of the nitre lost in the upper part of the tower, and thus provide for balancing the system.

I have found that if care is not taken to maintain the acid strength as given faulty operation will result. If the acid strength is permitted to increase, the amount of water vapor present in the gas while in contact with the acid will be too small to permit rapid oxidation of the $SO_2$ and nitrous gases. If the acid strength, and nitre content are permitted to drop it will be found that insufficient nitre will be present in the acid and gas and the rate of oxidation of $SO_2$ will again fall off.

The acid leaving tower 14 will have practically the same nitre content as the incoming acid, due to absorption of nitre in the lower half of the tower as above explained, and will be slightly concentrated in sulphuric acid. This acid passes out of the tower through an acid seal 19 and line 21 into pump tank 22, from which it is withdrawn through line 23 and elevated by pump 24 through line 25 into head tank 16 for recirculation through the system.

The gas from tower 14, free of sulfur dioxide but containing nitrous gases, some portion of which will ordinarily not yet have been completely reoxidized to absorbable higher oxidation compounds, escapes through line 26 into the bottom of a second oxidizing tower 27, which I have designated a tower chamber because it serves to some extent the same function as the last chambers of a chamber sulphuric acid plant, that is, to complete the reoxidation of the nitrous gases to absorbable compounds. This reoxidation is brought about by the free oxygen present in the gas, and it is for this reason that I have noted earlier in this specification that the sulphur dioxide gas introduced into the system should contain a substantial amount of free oxygen.

Inasmuch as the reoxidation of the nitrous gases will not take place to any great extent until all of the sulphur dioxide is oxidized, the capacity of towers 14 and 27 must be made sufficiently great that the gases in the system will remain mixed, after all of the sulphur dioxide is removed, sufficiently long that the nitrous gases will be substantialy reoxidized to absorbable compounds by the free oxygen in the gas.

I prefer to circulate a relatitvely small stream of the 52 to 54° Bé. acid from tank 16 through line 28 into tower 27, the flow of acid being controlled by valve 29 to provide an amount of acid just sufficient to wet the surfaces of the tower packing, which preferably is spiral tile or similar material adapted to provide a maximum surface area. By thus causing circulation of acid through tower 27 I provide for the solution and removal of any nitric acid which may be formed therein and thus not only eliminate the possibility of excessive corrosive action within the tower, but also provide further opportunity for absorption of oxidized nitrous gases in the acid; thus aiding in keeping the system in balance and maintaining the required amount of nitre in the acid supplied to tower 14, which might otherwise have to be replenished in nitre content from a separate source and thus increase the operating expense of the system.

The acid from tower 27, which will be somewhat strengthened in nitre by absorption from the gas as above explained, is withdrawn through acid seal 31 and passed through line 32 into pump tank 22 wherein it mixes with the acid coming from tower 14 and is again elevated to head tank 16 by pump 24.

As above explained, substantially all of the nitrous gases present in the gas issuing from tower 27 will have been reoxidized to the higher oxides of nitrogen and hence be in absorbable condition. This gas passes through line 33 into the bottom of absorbing tower 18 which is preferably filled with the same type of packing as tower 5. Acid of the same composition as that supplied to tower 5 is also supplied to the top of absorbing tower 18 through line 34 controlled by valve 35, the amount being regulated to provide sufficient acid in proportion to the quantity of gas treated such that substantially all of the contained nitrous gases will be absorbed in the acid during the passage of the gas upwardly through the tower. The remaining gas escapes from the top of the tower through line 36 and may be safely discharged directly to the atmosphere inasmuch as it contains no sulphur dioxide and but a relatively small amount of unobjectionable oxides of nitrogen which may have escaped absorption in tower 18, and which will normally be present in small amount in any event due to the appreciable vapor pressure of nitrous gas above the absorbing acid circulating through the tower. This loss of oxides of nitrogen represents practically the only loss from the system and is fully compensated for by the sulphuric acid recovered in the system.

The absorbing acid will concentrate somewhat in nitre as it passes through the tower, say from 1.1% at the top to about 1.3% at the bottom. The concentration acid passes from the tower through acid seal 37 and line 38 into pump tank 12 wherein it mixes with the partially denitrated acid from tower 5 and thereby brings the depleted nitre content of the latter acid back up to the strength desired for recirculation through the system.

The mixed acid is withdrawn from tank 12 through line 39 to pump 41 and elevated through line 42 into head tank 7. In the normal operation of the process under the conditions specified herein, it will be found that the towers 5 and 18 balance each other nicely and that the acid circulated to the towers may be maintained at proper strength and composition with no difficulty. I consider this feature of providing for the uniting of the two streams of acid from the towers 5 and 18 to be valuable in the operation of my process in that it permits a perfect balance to be maintained in the system and nevertheless requires but a single circulation system for causing the return of the oxides of nitrogen absorbed in tower 18 back into tower 5, where they are again liberated into the gas stream.

As previously explained, the sulphur dioxide oxidized in tower 5 will be transformed into sulphur trioxide and absorbed in the circulating acid, thus gradually strengthening this acid. To maintain the acid strength within the required range, I provide for the introduction of a controlled amount of the weaker 52 to 54° Bé. acid into the circulating 58.3 to 58.7° acid. This is preferably accomplished by continuously withdrawing the required amount of acid from head tank 16 through line 43 controlled by valve 44 and introducing the acid thus withdrawn into the top of tower 5. The stream of acid thus introduced will be very small, however, in proportion to the relatively large amount of stronger acid introduced through line 6 and will cause but an inappreciable immediate change in the composition of the stronger acid.

The small amount of $H_2SO_4$ made in tower 5 and the small amount of diluting acid continually added will, of course, gradually increase the total amount of acid in the system comprising the towers 5 and 18 and tanks 12 and 7, and the surplus acid must be disposed of. In accordance with my preferred method of operation, this surplus acid is continuously withdrawn and introduced into the 52 to 54° Bé. nitrosyl sulfuric acid system, together with sufficient water for dilution to the strength of the latter acid. This may be accomplished by withdrawing acid from line 6 through a line 45 connecting with tank 22, the flow of acid being controlled by valve 46. Preferably the diluting water is added to the weak acid system at the top of tower 14 through a line 47, the amount required being so small, however, that practically no immediate change will be brought about thereby in the composition of the circulating acid.

The quantity of 52 to 54° Bé. acid in the system comprising towers 14 and 27 and tanks 16 and 22 will, of course, gradually increase due to the addition of the stronger acid and to the absorption of $SO_3$ formed in tower 14. In accordance with my process, the surplus of this acid is utilized for the production of completely denitrated product acid, inasmuch as I have found that an efficient denitration of this strength of acid can be accomplished with the weak and relatively cold sulfur dioxide gas being treated in the system. This is accomplished by permitting the surplus acid accumulating in tank 22 to drain therefrom through line 48 into one of a pair of duplicate storage tanks 50 and 51, the flow of acid into the tanks being controlled by valves 52 and 53 respectively. One of the valves, for instance valve 52, is closed, and the other valve 53 permitted to remain open until tank 51 is full of acid, and then valve 53 is closed and valve 52 opened. Valve 55 in the bottom of tank 51 is then opened, valve 54 being closed, pump 56 is placed in operation, and the acid from tank 51 elevated through line 57 into the top of product denitrating tower 58. During this operation valve 59 in line 57 is, of course, permitted to remain open and valve 61 in product line 62 is closed. The acid thus introduced into the top of tower 58 flows downwardly therethrough over packing material, preferably of the same type as in tower 5, and then returns through acid seal 63 and line 64, valve 65 being open and valve 66 closed, into tank 51. Valve 67 in gas line 68 is now opened and valve 4 in line 3 adjusted to cause a portion of the fresh sulfur dioxide gas normally passing directly to tower 5 to pass into and through tower 58, wherein it passes upwardly in contact with the descending stream of acid and thoroughly denitrates the acid by driving out the absorbed oxides of nitrogen. The gas from this operation, charged with the liberated oxides of nitrogen, passes through line 69 into line 3 and thence into tower 5 and the remainder of the system, so that there is no loss of the nitre recovered from the product acid. The circulation of acid is continued until it is sufficiently denitrated for commercial use and then valve 59 is closed, valve 61 opened, and the acid withdrawn from the system through line 62 as product acid. In the meantime, acid has been accumulating in tank 50 and when this tank becomes full the operation is repeated as above described.

I have found that by operating in accordance with the above described process of my invention a rate of oxidation of sulfur dioxide very much higher than has heretofore been attained is made possible, coupled with a low loss of nitre from the system. For example, when operating upon .8% gas, I have found the cubic feet of space required in the system per pound of sulfur oxidized per day to be about 3.54, corresponding to approximately 3.64 cu. ft. of space in the system per cu. ft. of gas passed through the system per minute. The volume of the actual voids in the system will, of course, be only about one-half of this figure due to the presence of the packing in the towers. Inasmuch as the figure first given has a corresponding value of about 7 cu. ft. of space required in a standard chamber system operating upon strong $SO_2$ gas, and about 9 cu. ft. in the best of the intensified chamber systems operating upon weak $SO_2$ gas (.8%), it is evident that the permissible rate of gas flow through my system, which is proportional to the rate of oxidation or removal of sulfur dioxide, is enormously greater than in prior systems.

Various changes may, of course, be made in the exact manner of carrying out my invention as will be apparent to those skilled in the art, for example it may be found desirable to warm the gas or acid slightly in the tower 5 to expedite the reaction, but I consider that all such modifications as come within the appended claims are included within the scope of my invention.

I claim:

1. The process of oxidizing weak sulfur dioxide gas to sulfuric acid which comprises contacting said gas with nitrosyl sulfuric acid of 58.3 to 58.7° Bé. strength and having an initial nitre content of 1.5 to .6%, then contacting said gas with nitrosyl sulfuric acid of a strength of 52 to 54° Bé. and having an initial nitre content of not less than .12% until the gas is free of $SO_2$, permitting the gaseous products of this treatment to remain mixed until the contained nitrous gases are substantially reoxidized to absorbable compounds, and then contacting the gas with nitrosyl sulfuric acid of the same composition as that first named to absorb the oxidized nitrous gases.

2. The process of oxidizing weak sulfur dioxide gas to sulfuric acid which comprises contacting said gas with nitrosyl sulfuric acid of 58.3 to 58.7° Bé. strength and having an initial nitre content of 1.5 to .6% until the sulfur dioxide content of the gas falls below substantially .4%, then contacting the gas with nitrosyl sulfuric acid of a strength of 52 to 54° Bé. and having an initial nitre content of not less than .12% until the gas is free of sulfur dioxide, permitting the gaseous products of this treatment to remain mixed until the contained nitrous gases are substantially re-oxidized to absorbable compounds by the free oxygen in the gas, and then contacting the gas with nitrosyl sulfuric acid of the same composition as that first named to absorb the oxidized nitrous gases.

3. The process of oxidizing weak sulfur dioxide gas to sulfuric acid which comprises contacting said gas with nitrosyl sulfuric acid of 58.3 to 58.7° Bé. strength and having an initial nitre content of 1.5 to .6%, then contacting said gas with nitrosyl sulfuric acid of a strength of 52 to 54° Bé. and having an initial nitre content of not less than .12% until the gas is free of $SO_2$, permitting the gaseous products of this treatment to remain mixed until the contained nitrous gases are substantially reoxidized to absorbable compounds by the free oxygen in the gas, then contacting the gas with nitrosyl sulfuric acid of the same composition as that first named to absorb the oxidized nitrous gases, and denitrating an amount of the 52 to 54° Bé. acid corresponding to the production of sulfuric acid by contact with fresh sulfur dioxide gas and separating the de-nitrated product.

4. The process of oxidizing weak sulfur dioxide gas to sulfuric acid which comprises contacting a gas containing from .4 to 1.5% $SO_2$ with nitrosyl sulfuric acid of 58.3 to 58.7° Bé. strength and having an initial nitre content of 1.5 to .6% until the sulfur dioxide content of the gas falls below substantially .4%, then contacting the gas with nitrosyl sulfuric acid of a strength of 52 to 54° Bé. and having an initial nitre content of not less than .12% until the gas is free of sulfur dioxide, permitting the gaseous products of this treatment to remain mixed until the nitrous gases are substantially re-oxidized to absorbable compounds by the free oxygen in the gas, then contacting the gas with nitrosyl sulfuric acid of the same composition as that first named to absorb the oxidized nitrous gases, and de-nitrating an amount of the 52 to 54° Bé. acid corresponding to the production of sulfuric acid by contact with fresh sulfur dioxide and separating the de-nitrated product.

5. The process of oxidizing weak sulfur dioxide gas to sulfuric acid which comprises contacting said gas with nitrosyl sulfuric acid of 58.3 to 58.7° Bé. strength and having an initial nitre content of 1.5 to .6% then contacting said gas with nitrosyl sulfuric acid of a strength of 52 to 54° Bé. and having an initial nitre content of not less than .12% until the gas is free of sulfur dioxide and for a period of time thereafter at least as great as that required for said 52 to 54° Bé. acid to oxidize the sulfur dioxide, permitting the gaseous products of this treatment to remain mixed until the contained nitrous gases are substantially re-oxidized to absorbable compounds by the free oxygen in the gas, and then contacting the gas with nitrosyl sulfuric acid of the same composition as that first named to absorb the oxidized nitrous gases.

6. The process of oxidizing weak sulfur dioxide gas to sulfuric acid which comprises contacting said gas with nitrosyl sulfuric acid of 58.3 to 58.7° Bé. strength and having an initial nitre content of 1.5 to .6%, then contacting said gas with nitrosyl sulfuric acid of a strength of 52 to 54° Bé. and having an initial nitre content of not less than .12% until the gas is free of sulfur dioxide and the nitrous gases are substantially re-oxidized to absorbable compounds by the free oxygen in the gas, and then contacting the gas with nitrosyl sulfuric acid of the same composition as that first named to absorb the oxidized nitrous gases.

7. The process of oxidizing weak sulfur dioxide gas to sulfuric acid which comprises contacting said gas with nitrosyl sulfuric acid of 58.3 to 58.7° Bé. strength and having an initial nitre content of 1.5 to .6% until the sulfur dioxide content of the gas falls below substantially .4%, then contacting the gas with nitrosyl sulfuric acid of 52 to 54° Bé. strength until the gas is free of sulfur dioxide and for a period of time thereafter at least as great as that required for said 52 to 54° Bé. acid to oxidize said sulfur dioxide, permitting the gaseous products of this treatment to remain mixed until the contained nitrous gases are substantially reoxidized to absorbable compounds by the free oxygen in the gas, and then contacting the gas with nitrosyl sulfuric acid of the same composition as that first named to absorb the oxidized nitrous gases.

8. The process of oxidizing weak sulfur dioxide gas to sulfuric acid which comprises contacting a gas containing from .4 to 1.5% sulfur dioxide with nitrosyl sulfuric acid of 58.3 to 58.7° Bé. strength and having an initial nitre content of 1.5 to .6% until the sulfur dioxide content of the gas falls below substantially .4%, then contacting the gas with nitrosyl sulfuric acid of a strength of 52 to 54° Bé. and having an initial nitre content of not less than .12% until the gas is free of sulfur dioxide, permitting the gaseous products of this treatment to remain mixed until the contained nitrous gases are substantially re-oxidized to absorbable compounds, then contacting the gas with nitrosyl sulfuric acid of the same composition as that first named to absorb the oxidized nitrous gases, denitrating an amount of the 52 to 54° Bé. acid corresponding to the production of sulfuric acid by contact with fresh sulfur dioxide gas and separating the denitrated product, and replenishing the supply of 52 to 54° Bé. acid by the addition of a portion of said 58.3 to 58.7° Bé. acid plus sufficient water for dilution to the strength desired.

9. The process of oxidizing weak sulfur dioxide gas to sulfuric acid which comprises contacting said gas with nitrosyl sulfuric acid of 58.3 to 58.7° Bé. strength and having an initial nitre content of 1.5 to .6%, then contacting said gas with nitrosyl sulfuric acid of a strength of 52 to 54° Bé. and having an initial nitre content of not less than .12% until the gas is free of $SO_2$, permitting the gaseous products of this treatment to remain mixed until the contained nitrous gases are substantially re-oxidized to absorbable compounds by the free oxygen in said gas, then contacting the gas with nitrosyl sulfuric acid of the same composition as that first named to absorb the oxidized nitrous gases, uniting the acid resulting from the first and last steps above described to provide a source of said acid and utilizing the mixed acid from said source for further conducting said first and last operations as described, de-nitrating an amount of the 52 to 54° Bé. acid corresponding to the production of sulfuric acid by contact with fresh sulfur dioxide gas and separating the de-nitrated product, replenishing the supply of 52 to 54° Bé. acid by the addition of a portion of said 58.3 to 58.7° Bé. acid, and maintaining the strength of the 58.3 to 58.7° Bé. acid by the addition of a portion of the 52 to 54° Bé. acid.

10. The process of oxidizing weak sulfur dioxide gas containing from .4 to 1.5% $SO_2$ to sulfuric acid which comprises introducing nitrous gas into said gas, contacting said gas in co-current flow with nitrosyl sulfuric acid of 58.3 to 58.7° Bé. strength and having an initial nitre content of 1.5 to .6% until the sulfur dioxide content of the gas falls below substantially .4%, then contacting the gas with nitrosyl sulfuric acid of a strength of 52 to 54° Bé. and having an initial nitre content of not less than .12% until the gas is free of sulfur dioxide and for a period of time thereafter sufficient to substantially re-oxidize the contained nitrous gases to absorbable compounds by the free oxygen contained in the gas, then contacting the gas with nitrosyl sulfuric acid of the same composition as that first named to absorb the oxidized nitrous gases, de-nitrating an amount of the 52 to 54° Bé. acid corresponding to the production of sulfuric acid by contact with fresh sulfur dioxide and separating the de-nitrated product, replenishing the supply of 52 to 54° Bé. acid by the addition of a portion of the 58.3 to 58.7° Bé. acid plus sufficient water for dilution to the strength desired, uniting the two streams of acid resulting from the treatments of the gas with the 58.3 to 58.7° Bé. acid to provide a common source of said acid, and maintaining the strength thereof as stated by the addition thereto of a portion of the 52 to 54° Bé. acid.

11. The process of oxidizing weak sulfur dioxide gas to sulfuric acid which comprises contacting said gas with nitrosyl sulfuric acid of 58.3 to 58.7° Bé. strength and having an initial nitre content of 1.5 to .6%, then contacting said gas with nitrosyl sulfuric acid of a strength of 52 to 54° Bé. and having an initial nitre content of not less than .12% until the gas is free of $SO_2$, reoxidizing the contained nitrous gases to absorbable compounds, and then contacting the gas with nitrosyl sulfuric acid of the same composition as that first named to absorb the oxidized nitrous gases.

In testimony whereof, I affix my signature.

HENRY F. MERRIAM.

CERTIFICATE OF CORRECTION.

Patent No. 1,822,447.  Granted September 8, 1931, to

HENRY F. MERRIAM.

It is hereby certified that error appears in the printed specification of the above numbered patent requiring correction as follows: Page 4, line 15, before "acid" insert Bé; page 5, line 43, claim 2, strike out the words "by the free oxygen in the gas,"; and that the said Letters Patent should be read with these corrections therein that the same may conform to the record of the case in the Patent Office.

Signed and sealed this 3rd day of November, A. D. 1931.

(Seal)

M. J. Moore,
Acting Commissioner of Patents.